Figure 1:
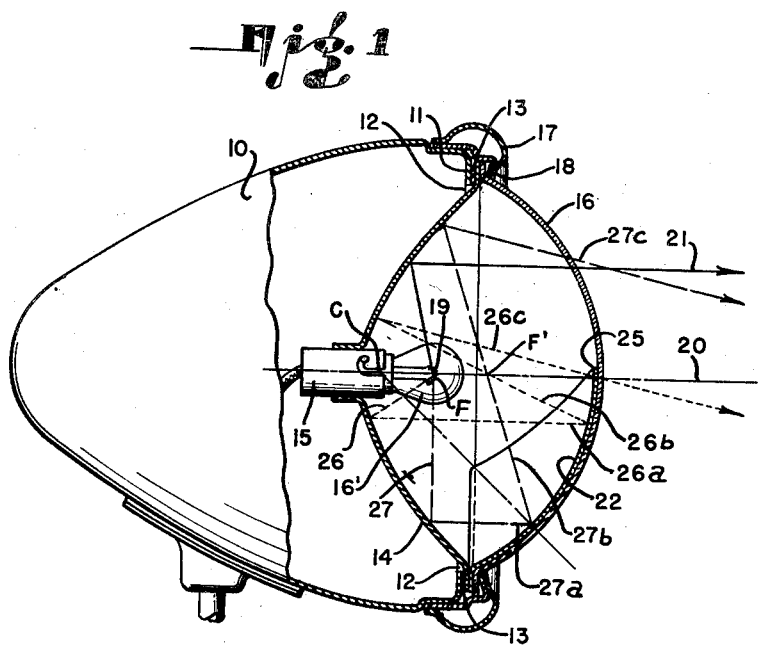

Jan. 5, 1954

L. E. RYNEARSON 2,665,371

GLARE SHIELD ATTACHMENT FOR AUTOMOBILE HEADLIGHTS

Filed July 5, 1949

INVENTOR.
LUTHER EDWARD RYNEARSON
BY

ATTORNEY

Patented Jan. 5, 1954

2,665,371

UNITED STATES PATENT OFFICE 2,665,371

GLARE SHIELD ATTACHMENT FOR AUTOMOBILE HEADLIGHTS

Luther Edward Rynearson, Riverside, Calif.

Application July 5, 1949, Serial No. 103,077

1 Claim. (Cl. 240—46.01)

The present invention relates generally to an attachment for the headlights of automobiles and similar vehicles; and is more particularly concerned with means for modifying the projected light rays in such a manner as to eliminate glare to approaching motorists and pedestrians, and at the same time utilize the projected light rays in such manner as to illuminate more efficiently the highway in front of the vehicle.

It is one object of the herein described invention to provide an improved glare shield attachment of simple, inexpensive construction, which may be utilized with vehicle headlights.

Another object is to provide a novel headlight glare shield which will intercept certain of the glare-forming light rays, and which, instead of wasting such rays, will redirect them onto the highway at such an angle as to materially increase the highway illumination in front of the vehicle, and eliminate the glare that would otherwise result from such rays, if projected in the conventional manner.

Further objects of the invention will be brought out in the following part of the specification, wherein detailed description is for the purpose of fully disclosing the invention without placing limitations on the scope of the invention defined in the appended claim.

Figure 2:
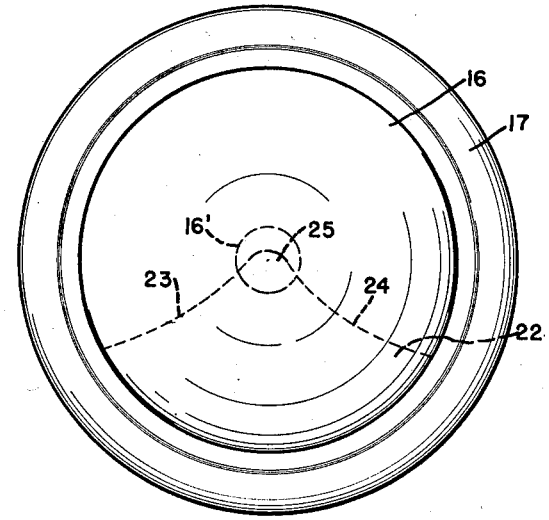

Referring to the drawings, which are for illustrative purposes only:

Fig. 1 is a side elevational view of a headlight having a glare shield attachment of the present invention applied thereto, a portion of the headlight casing being broken away and a vertical longitudinal section taken to disclose essential features of construction; and Fig. 2 is a front elevational view, looking toward the front of the headlight.

Referring now to the drawings, the present invention is illustrated as being applied to a vehicle headlight, such as utilized in connection with automobiles or similar vehicles. The headlight in general comprises a housing or casing 10 of conventional form, in this instance being streamlined and having a forward end flange 11 defining a window opening 12.

The opening 12 is adapted to have seated therein against a seating gasket 13 the peripheral margin of a conventional parabolic reflector 14 centrally arranged at its center for supporting a lamp socket 15 adapted to conventionally receive and mount therein a lamp 16' forming a light source for the headlight.

The window opening is closed by a transparent window 16, which in this instance is of concave formation for a purpose to be subsequently described. The window 16 is retained in position over the parabolic reflector 14 by an annular lamp housing rim 17 having a slide fit with the housing 10 and an inner edge margin 18 adapted to clampingly bear against the peripheral marginal portion of the window, this lamp housing rim serving to retain both the parabolic reflector and the window in operative association in the housing.

The construction thus far described operates in conventional manner. In this respect, it may be mentioned that the lamp 16' is so arranged that its filament 19 is disposed substantially at the primary focus F of the parabolic reflector 14 and lies on the reflector main axis as indicated by the numeral 20. With this arrangement, light rays in conventional manner emanating from the filament 19 and falling upon the parabolic reflector, will be concentrated and forwardly projected in parallel light rays, such as indicated by the numeral 21 in substantially parallel relation to form a light beam.

As is well known, the usual projected light beam from conventional headlights produces a glare to approaching vehicles and pedestrians, and in many instances causes a blinding effect which is undesirable and constitutes a hazard which may result in injury or accident to pedestrians or persons in an approaching vehicle.

The present invention eliminates, or reduces to a minimum, the hazardous effect by the elimination of glare resulting from light rays in a portion of the headlight beam, namely the lower portion thereof. I have determined that the light rays in the lower portion of the projected beam are the most detrimental in the production of glare, and by the elimination of the light rays in this portion of the beam, the glare is largely corrected with respect to pedestrians and approaching automobiles.

One manner in which the glare may be eliminated is by providing a shield 22 which is of generally sector-shape with side edges 23 and 24 which converge generally toward a substantially pointed portion or end 25 which extends to or slightly past the main axis 20 of the parabolic reflector 14.

In the present instance, the shield 22 is disclosed as forming an inner lining portion of the window 16, and by making this shield of material which is non-light-transmitting, it will act as a screening shield to intercept the lower part of the light beam which would normally be projected by the parabolic reflector 14.

While the shield 22 is disclosed as an inner lining of the windows 16, the screening effect may also be obtained by etching or otherwise making a non-light-transmitting sector corresponding to the general shape of the shield 22 in the lower part of the window 16 by etching or otherwise modifying its transparent quality.

As an additional feature of the present invention, it is further proposed to make use of the light rays intercepted by the shield 22, for general illumination of the highway ahead of the vehicle. For such purpose, the shield 22 if formed as a separate part, or the window 16, if the shield is formed as a liner layer thereon, is made with a center of curvature C such that a principal focus for a spherical reflecting surface on the shield 22 or window 16 will be formed at F' on the main axis 20. Parallel light rays emanating from the parabolic reflector in the lower portion of the beam, which strike the reflector surface on the shield 22 or window 16, will be reflected substantially through the primary focus F' and directed back to the parabolic reflector in such a direction that the redirected light rays will be again reflected from the parabolic reflector at an angle to the normal parallel beam rays.

More specifically, a light ray 26, as shown in dotted lines, from the filament 19 will strike the reflector 14 near its central portion and be reflected along path 26a parallel to the main axis 20 until it strikes the surface of member 22, whereupon it will pass through the principal focus F' along path 26b until it again strikes the parabolic reflector 14. Since the primary focus F' is positioned ahead of the primary focus F of the parabolic reflector 14, the light ray upon again being reflected will not be along an axis parallel to the main axis 20 but will be along a path as indicated at 26c which is angularly disposed to the main axis and is inclined downwardly so as to strike the highway ahead of the vehicle.

For illustrative purposes, another light ray as indicated by dash line 27 will be considered, this ray being one which will strike adjacent the outer margin of the parabolic reflector 14. In a similar manner, this light ray follows a path 27a—27b—27c, which passes through the primary focus F' and emerges along the path 27c which forms the same angle with the main axis as the other light ray 26c.

From the foregoing description, it is believed that it will be clearly apparent that the present invention has provided a novel glare shield for modifying the projected light rays in such a manner as to eliminate glare and at the same time utilize the projected light rays in such a manner as to illuminate more efficiently the highway in front of the vehicle, and conserve rather than waste the light rays which are intercepted for eliminating glare.

I claim:

An anti-glare window attachment for a head light having a main parabolic reflector by which light rays emanating from its principal focus are projected toward the window as a beam of parallel rays, comprising: a member having a generally sector-shaped spherical concave reflecting surface bounded by side edges generally converging to form an apex portion at their contiguous ends, and a curved edge connecting the other ends of the side edges; and means for supporting said member with the apex portion of said reflecting surface extending over the beam axis and generally extending symmetrically therebelow into the rays of the lower part of the beam with said curved edge lying in a plane rearwardly of said apex portion at right angles to said beam axis, and at a distance forwardly of the main reflector such that the focus of the reflecting surface will be forward of said principal focus of the parabolic reflector; whereby the beam will be devoid of those parallel rays in that part of its lower portion intercepted by said member, and said intercepted rays will be redirected and again reflected in a non-glare forming direction at an angle to the rays normally constituting said beam.

LUTHER EDWARD RYNEARSON.

References Cited in the file of this patent

UNITED STATES PATENTS

| Number | Name | Date |
|---|---|---|
| 1,369,722 | Ames | Feb. 22, 1921 |
| 1,398,823 | Wright | Nov. 29, 1921 |
| 1,536,006 | Howard | Apr. 28, 1925 |
| 1,568,079 | May | Jan. 5, 1926 |
| 2,236,942 | Frazier | Apr. 1, 1941 |
| 2,349,042 | Holmes | May 16, 1944 |

FOREIGN PATENTS

| Number | Country | Date |
|---|---|---|
| 156,024 | Great Britain | Jan. 6, 1921 |
| 297,672 | Great Britain | Sept. 12, 1929 |

OTHER REFERENCES

Jenkins and White, "Fundamentals of Optics," 2nd ed. (1950), pages 80 and 90. (Copy in Div. 65.)